US012544672B2

(12) United States Patent
Nishikido

(10) Patent No.: US 12,544,672 B2
(45) Date of Patent: Feb. 10, 2026

(54) INFORMATION PROCESSING DEVICE AND PROGRAM

(71) Applicant: SONY INTERACTIVE ENTERTAINMENT INC., Tokyo (JP)

(72) Inventor: Masanao Nishikido, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 289 days.

(21) Appl. No.: 18/022,891

(22) PCT Filed: Sep. 27, 2021

(86) PCT No.: PCT/JP2021/035255

§ 371 (c)(1),
(2) Date: Feb. 23, 2023

(87) PCT Pub. No.: WO2022/071178

PCT Pub. Date: Apr. 7, 2022

(65) Prior Publication Data

US 2023/0293997 A1 Sep. 21, 2023

(30) Foreign Application Priority Data

Oct. 2, 2020 (JP) ................................ 2020-167944

(51) Int. Cl.
*A63F 13/63* (2014.01)
*A63F 13/533* (2014.01)
(Continued)

(52) U.S. Cl.
CPC ............ *A63F 13/63* (2014.09); *A63F 13/533* (2014.09); *A63F 13/79* (2014.09); *A63F 13/5255* (2014.09)

(58) Field of Classification Search
CPC ........ A63F 13/79; A63F 13/525; A63F 13/67; A63F 13/63
See application file for complete search history.

(56) References Cited

U.S. PATENT DOCUMENTS 6,287,201 B1 * 9/2001 Hightower ............ A63F 13/803 463/6
8,029,360 B2 * 10/2011 Lind ..................... G07F 17/323 463/40
(Continued)

FOREIGN PATENT DOCUMENTS

JP 2000107465 A 4/2000
JP 2015002770 A 1/2015
JP 2020076736 A 5/2020

OTHER PUBLICATIONS

International Search Report and Written Opinion dated Dec. 14, 2021, from PCT/JP2021/035255, 8 sheets.
(Continued)

*Primary Examiner* — James S. McClellan
(74) *Attorney, Agent, or Firm* — Kilpatrick Townsend & Stockton LLP

(57) ABSTRACT

A preference holding section 112 holds information denoting a preference of a user with respect to at least one item, the information being applicable to multiple applications. A providing section 114 provides the information denoting the preference of the user to the applications. The preference holding section 112 holds the information denoting the preference of the user with regard to a level of difficulty in game.

20 Claims, 11 Drawing Sheets

(51) Int. Cl.
*A63F 13/79* (2014.01)
*A63F 13/5255* (2014.01)

(56) References Cited

U.S. PATENT DOCUMENTS

| | | | | |
|---|---|---|---|---|
| 2002/0142825 | A1* | 10/2002 | Lark | G06Q 20/382 463/16 |
| 2011/0136568 | A1* | 6/2011 | Buhr | A63F 13/22 463/37 |
| 2011/0191686 | A1* | 8/2011 | Wolff-Petersen | G06F 3/0484 715/735 |
| 2012/0071244 | A1* | 3/2012 | Gillo | A63F 13/00 709/227 |
| 2015/0251085 | A1* | 9/2015 | Banker | A63F 9/0098 463/9 |

OTHER PUBLICATIONS

Final Fantasy XIII-2, Square Enix, Dec. 16, 2011 (JPO Industrial Property Library receipt date), pp. 7-9.

* cited by examiner

10

INFORMATION PROCESSING DEVICE AND PROGRAM

TECHNICAL FIELD

The present invention relates to a technology for establishing settings of applications.

BACKGROUND ART

When starting a game for the first time, a user selects settings of various items prepared for the game, such as a level of difficulty, camera operations, and subtitles. For example, the level-of-difficulty item includes an easy mode for beginners, a normal mode for average players, and a hard mode for advanced players, as the settings. The user is to select a play mode deemed fit for his or her ability. The camera-operations item includes multiple settings for determining directions of camera movements in response to up-down and left-right operations of an analog stick. Specifically, the user selects whether to move the camera upward or downward in response to the analog stick being operated upward and whether to move the camera rightward or leftward in response to the analog stick being operated to the right. The game settings selected by the user are used to control game progress and game operations.

SUMMARY

Technical Problem

When starting a game for the first time, the user sets a game environment fit for his or her preference by selecting the settings of the various items of the game. In other words, every time a new game is started, the user is not allowed to set the preferred game environment without first selecting the settings of the items in the game. In view of this, a scheme has thus been desired in which labor is saved on the work of selecting the settings for game progress and game operations.

In view of the above, an object of the present invention is to provide a scheme for saving labor on the work of selecting the settings of applications.

Solution to Problem

In order to solve the problem above, an information processing device according to one aspect of the present invention includes a preference holding section configured to hold information denoting a preference of a user, the information being applicable to a plurality of applications with respect to at least one item, and a providing section configured to provide the information denoting the preference of the user to the applications.

Another aspect of the present invention relates to a program for causing a computer capable of accessing a holding section holding information denoting a preference of a user to implement a function of acquiring the information denoting the preference of the user from the holding section, and a function of determining a setting of an application according to the acquired information denoting the preference of the user.

Incidentally, if other combinations of the above-outlined composing elements or the above expressions of the present invention are converted between different forms such as a method, a device, a system, a recording medium, and a computer program, they still constitute effective aspects of this invention.

DESCRIPTION OF EMBODIMENTS

Figure 1:
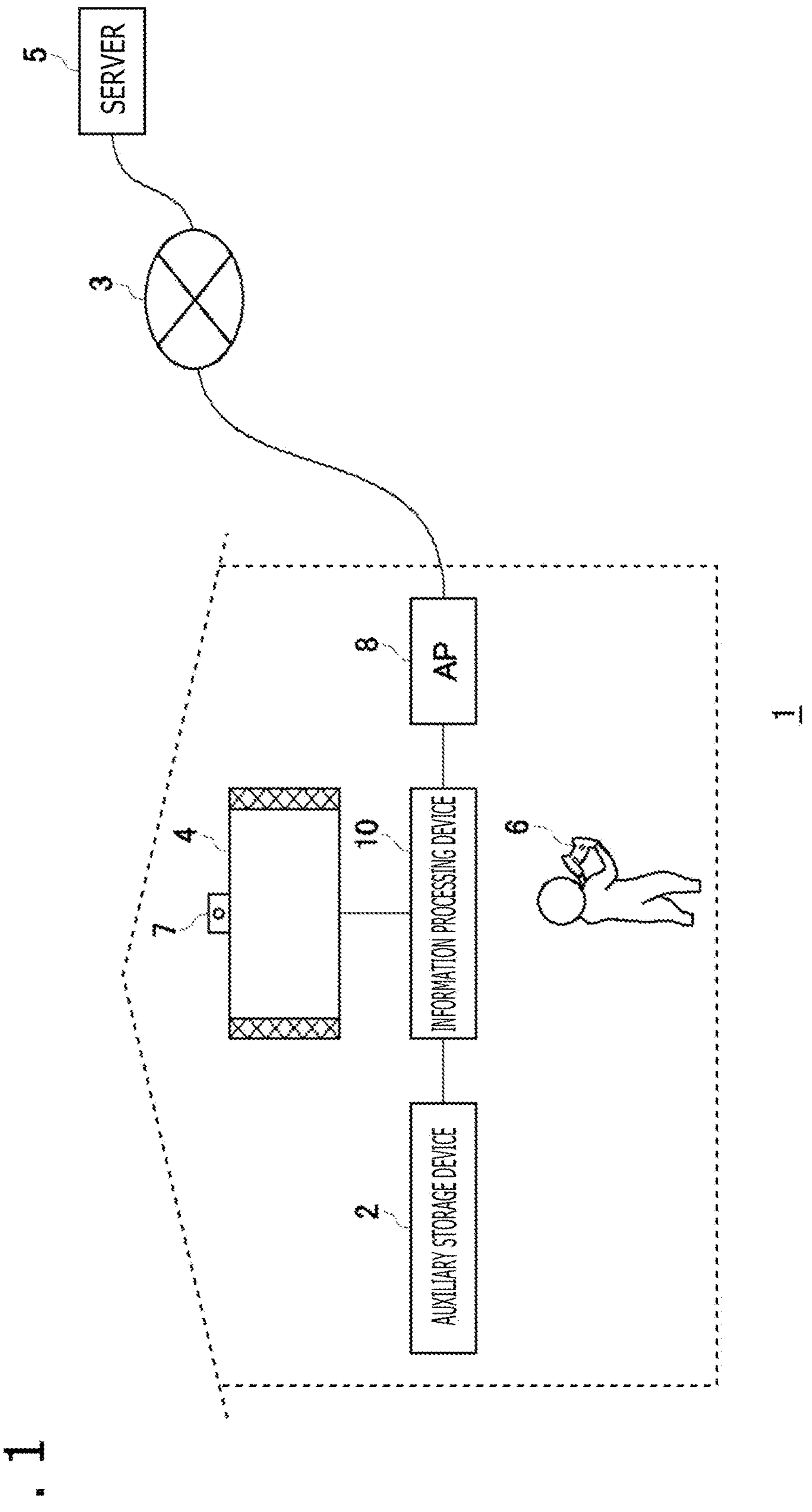
FIG. 1 is a diagram depicting an information processing system as one embodiment of this invention.

FIG. 1 depicts an information processing system 1 as one embodiment of the present invention. The information processing system 1 may be a game system that includes an information processing device 10 as a user terminal and a server 5. An access point (referred to as an "AP" hereunder) 8 has functions of a wireless access point and of a router. The information processing device 10 is connected in a wired or wireless manner to the AP 8 so as to connect communicably with the server 5 on a network 3.

The information processing device 10 is connected by wire or wirelessly with an input device 6 operated by the user. The input device 6 outputs the information operated by the user to the information processing device 10. Upon receipt of the operation information from the input device 6, the information processing device 10 has the received information reflected in the processing of system software and application software, and causes an output device 4 to output results of the processing. In the information processing system 1, the information processing device 10 is a game device (game console) for executing games, and the input device 6 is equipment that supplies the operation information from the user to the information processing device 10. The input device 6 may be a game controller that includes multiple input sections such as multiple push type operation buttons, an analog stick for inputting analog quantities, and a rotary button.

An auxiliary storage device 2 may be a mass storage device such as an HDD (Hard Disk Drive) or an SSD (Solid State Drive). The auxiliary storage device 2 may be either an internal storage device or an external storage device connected with the information processing device 10 via USB (Universal Serial Bus), for example. The output device 4 may be a television set that has a display unit for outputting images and speakers for outputting sounds. The output device 4 may be connected by wire or wirelessly with the information processing device 10.

A camera 7 acting as an imaging device positioned near the output device 4 acquires images of the space around the output device 4. Whereas FIG. 1 depicts an example in which the camera 7 is mounted at the top of the output device 4, the camera 7 may alternatively be positioned on the side of or under the output device 4. In any case, the camera 7 is placed in a position that permits imaging of the user in front of the output device 4. The camera 7 may be a stereo camera.

The server 5 provides a network service to the users of the information processing system 1. The server 5 manages network accounts identifying the individual users. Using the network account, each user signs in to the network service provided by the server 5. By signing in from the information processing device 10 to the network service, the user can register in the server 5 the data saved from the game and trophies acquired during playing games as virtual prizes.

Figure 2:
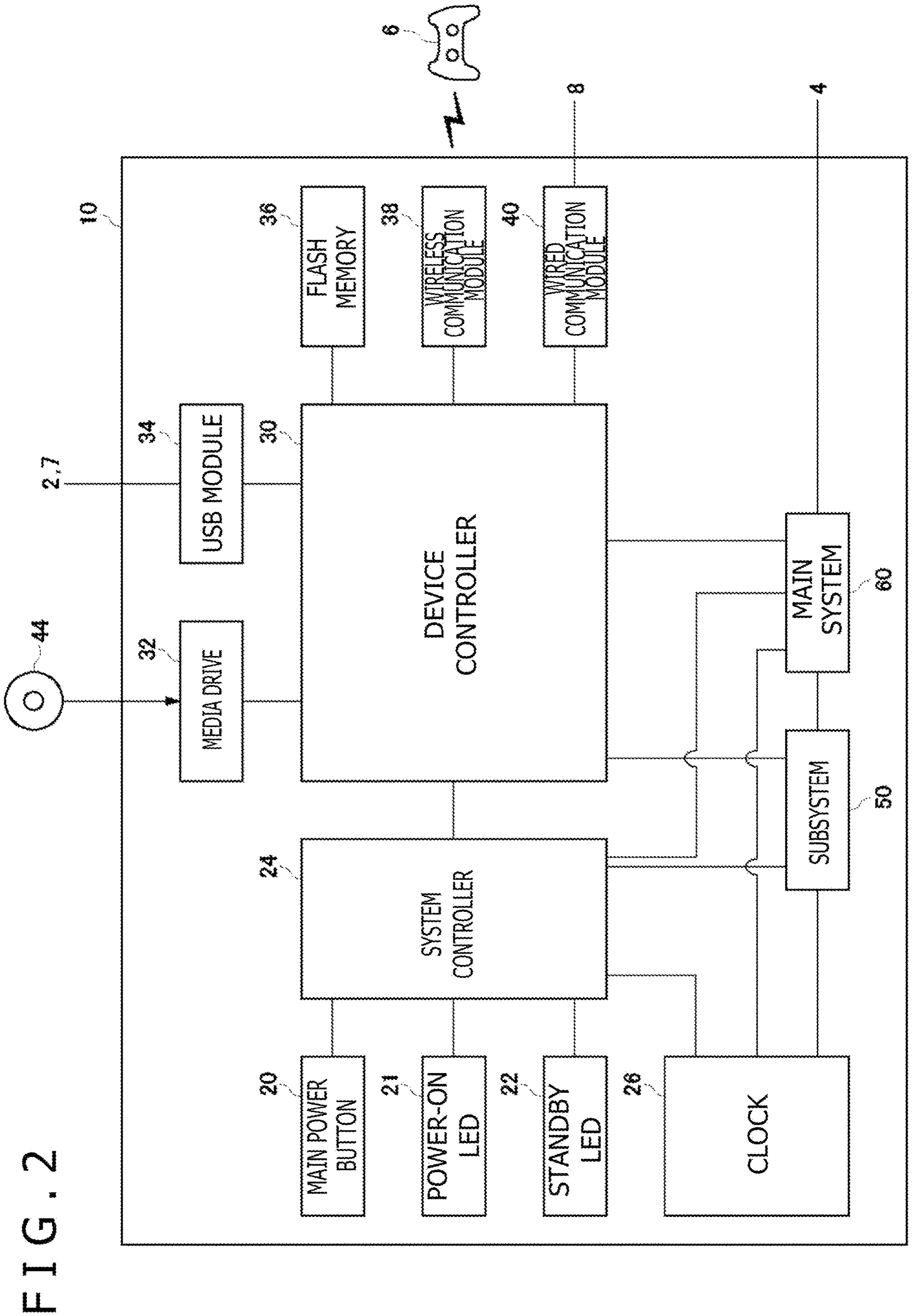
FIG. 2 is a diagram depicting a hardware configuration of an information processing device.

FIG. 2 depicts a hardware configuration of the information processing device 10. The information processing device 10 includes a main power button 20, a power-ON LED (Light-Emitting Diode) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (Central Processing Unit), a memory as a main storage device, a memory controller, a GPU (Graphics Processing Unit), and the like. The GPU is mainly used for arithmetic processing of game programs. The main CPU starts the system software and, in an environment provided by the system software, offers the function of executing the game program installed in the auxiliary storage device 2. The subsystem 50 has a sub-CPU, a memory as a main storage device, and a memory controller, and does not include the GPU.

Whereas the main CPU has a function of executing the game program installed in the auxiliary storage device 2 or in a ROM (Read-Only Memory) medium 44, the sub-CPU has no such function. However, the sub-CPU has functions of accessing the auxiliary storage device 2 and of transmitting and receiving data to and from the server 5. Configured with such limited processing functions only, the sub-CPU can operate on less power than the main CPU. These sub-CPU functions are executed when the main CPU is in a standby state.

The main power button 20 is an input section that receives operation input from the user. Positioned at the front of the housing of the information processing device 10, the main power button 20 is operated to turn on and off the supply of power to the main system 60 of the information processing device 10. The power-ON LED 21 is lit when the main power button 20 is turned on. The standby LED 22 is lit when the main power button 20 is turned off. The system controller 24 detects pressing of the main power button 20 by the user.

The clock 26 is a real-time clock that generates current date and time information. The clock 26 supplies the generated information to the system controller 24, the subsystem 50, and the main system 60.

The device controller 30 is configured as an LSI (Large-Scale Integrated Circuit) such as a Southbridge executing transfers of information between devices. As depicted in the drawing, the device controller 30 is connected with such devices as the system controller 24, the media drive 32, the USB module 34, the flash memory 36, the wireless communication module 38, the wired communication module 40, the subsystem 50, and the main system 60. The device controller 30 absorbs differences in electrical characteristics and data transfer rates between the devices, thereby controlling the timing of the data transfers therebetween.

The media drive 32 is a drive device which, when loaded with the ROM medium 44 with application software such as games and their license information recorded thereon, drives the loaded medium to read programs and data therefrom. The ROM medium 44 is a read-only recording medium such as an optical disc, a magneto-optical disc, and a Blu-ray disc.

The USB module 34 is a module that connects with an external device via a USB cable. The USB module 34 may also be connected with the auxiliary storage device 2 and the camera 7 via a USB cable. The flash memory 36 is an auxiliary storage device that constitutes an internal storage. The wireless communication module 38 communicates wirelessly with the input device 6, for example, based on communication protocols such as the Bluetooth (registered trademark) protocol or IEEE (Institute of Electrical and Electronics Engineers) 802.11 protocol. The wired communication module 40 communicates with an external device in a wired manner to connect to the network 3 via the AP 8, for example.

Figure 3:
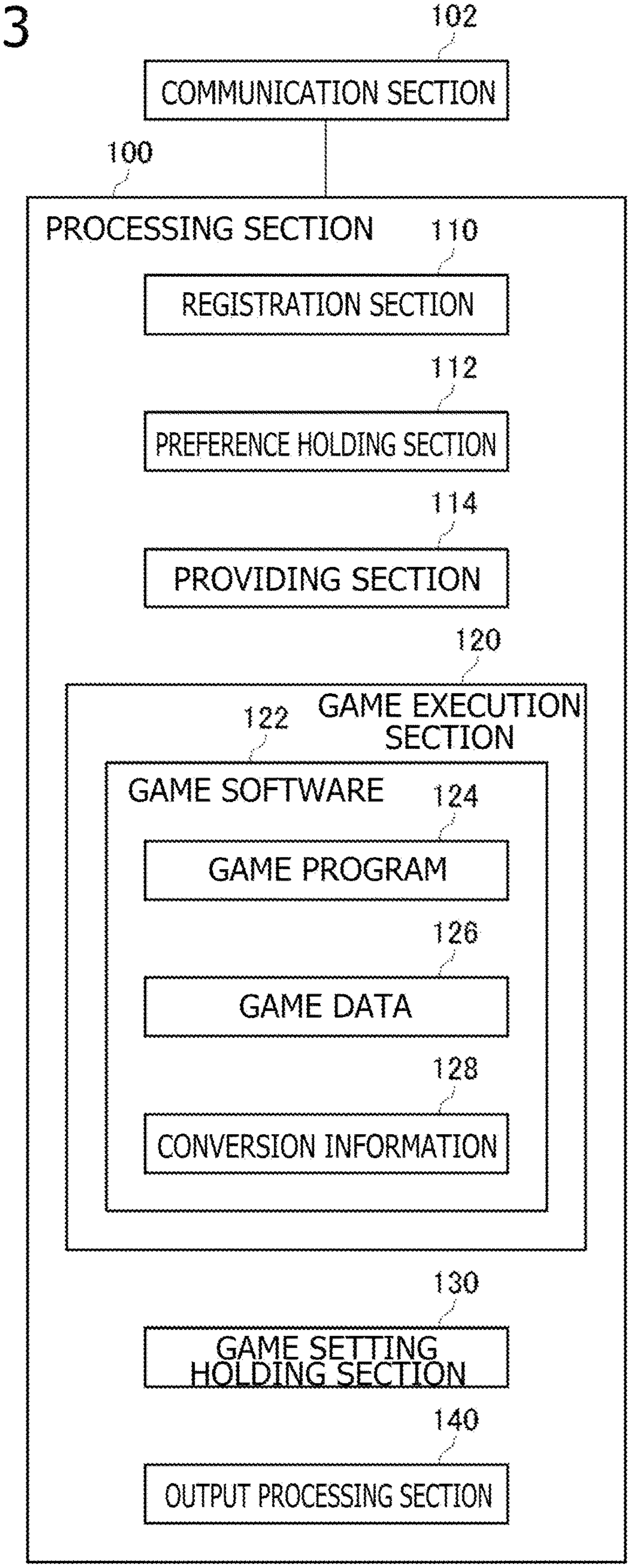
FIG. 3 is a diagram depicting the functional blocks of the information processing device.

FIG. 3 depicts functional blocks of the information processing device 10. The information processing device 10 includes a processing section 100 and a communication section 102. The processing section 100 includes a registration section 110, a preference holding section 112, a providing section 114, a game execution section 120, a game setting holding section 130, and an output processing section 140. The game execution section 120 executes game software 122 including at least a game program 124, game data 126, and conversion information 128. The communication section 102 is represented as a configuration that has the functions of both the wireless communication module 38 and the wired communication module 40 depicted in FIG. 2. The wireless communication module 38 may handle communication with the input device 6, and the wired communication module 40 may handle communication with the server 5.

Various constituent elements depicted in FIG. 3 as the functional blocks for performing diverse processes may be implemented by hardware using circuit blocks, memories, and other LSIs or by software using programs loaded in memory. It will thus be understood by those skilled in the art that these functional blocks can be implemented by hardware alone, by software alone, or by a combination of both in diverse forms and that the implementation is not limited to a particular form.

The information processing device 10 of the embodiment holds information denoting the user's preference applicable to multiple applications (referred to as "preference information" hereunder). The information processing device 10 has a function of providing the preference information to a new application when it is executed for the first time. In a case where the application is a game, for example, the game may have the preference information reflected in the settings for game progress and game operations, thereby saving labor for the user in selecting the settings.

The registration section 110 performs the process of registering the preference information to the preference holding section 112.

Figure 4:
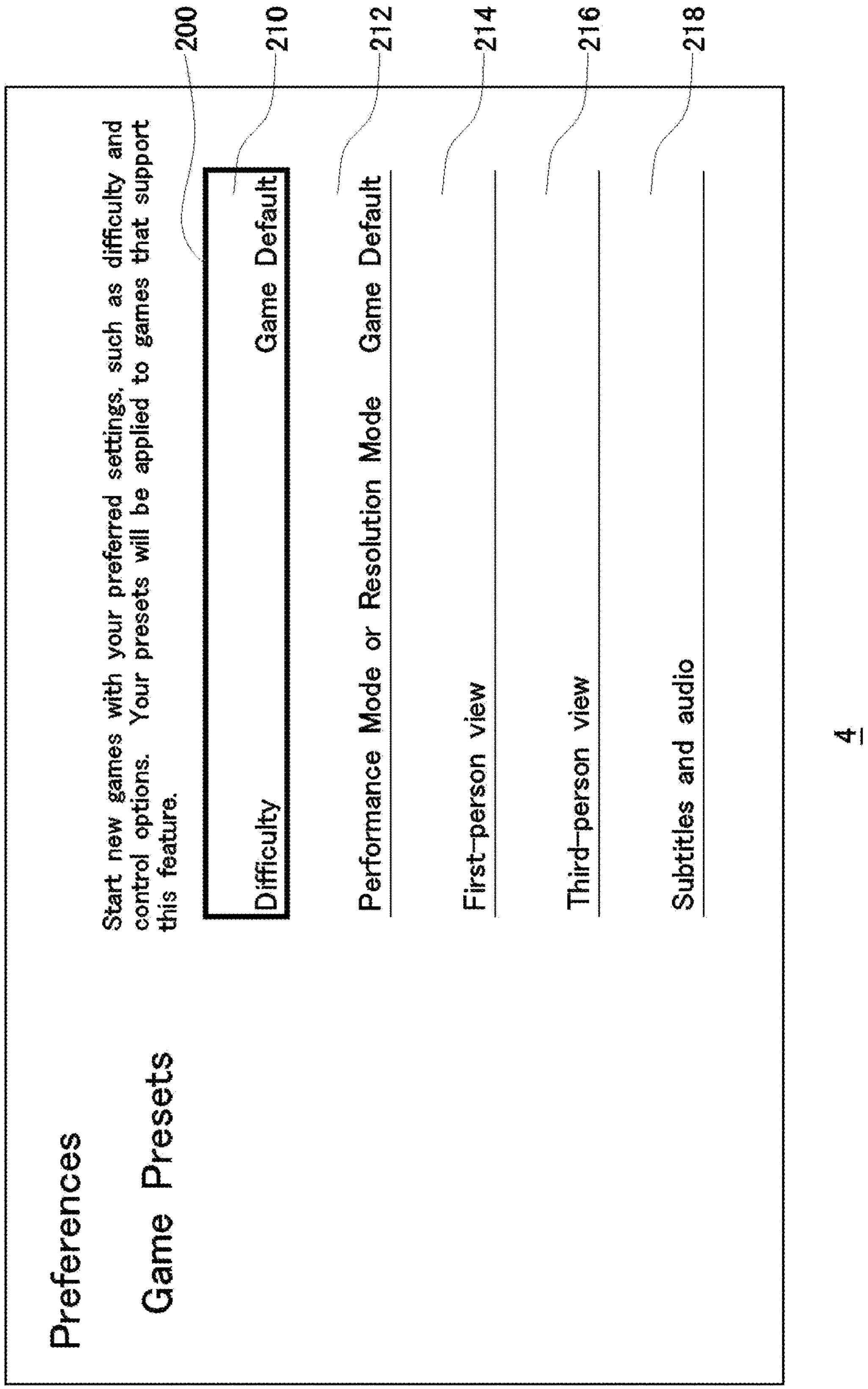
FIG. 4 is a diagram depicting an example of a preference information setting screen.

FIG. 4 depicts an example of a preference information setting screen. The registration section 110 causes the output device 4 to display the preference information setting screen. The preference information denoting the user's preference in game play is shared by multiple applications. Multiple setting items 210, 212, 214, 216, and 218 are prepared on the setting screen in FIG. 4. The user selects each setting item by moving a focus frame 200 across the setting screen. The user places the focus frame 200 on the display region of a given setting item, operates the OK button of the input device 6, and selects one of the settings for the item of interest. In the state of FIG. 4, the focus frame 200 is placed on the display region of the setting item 210 for the level of difficulty in the game. Operating the OK button causes the registration section 110 to display a selection window for selecting the level of difficulty in the game.

Figure 5:
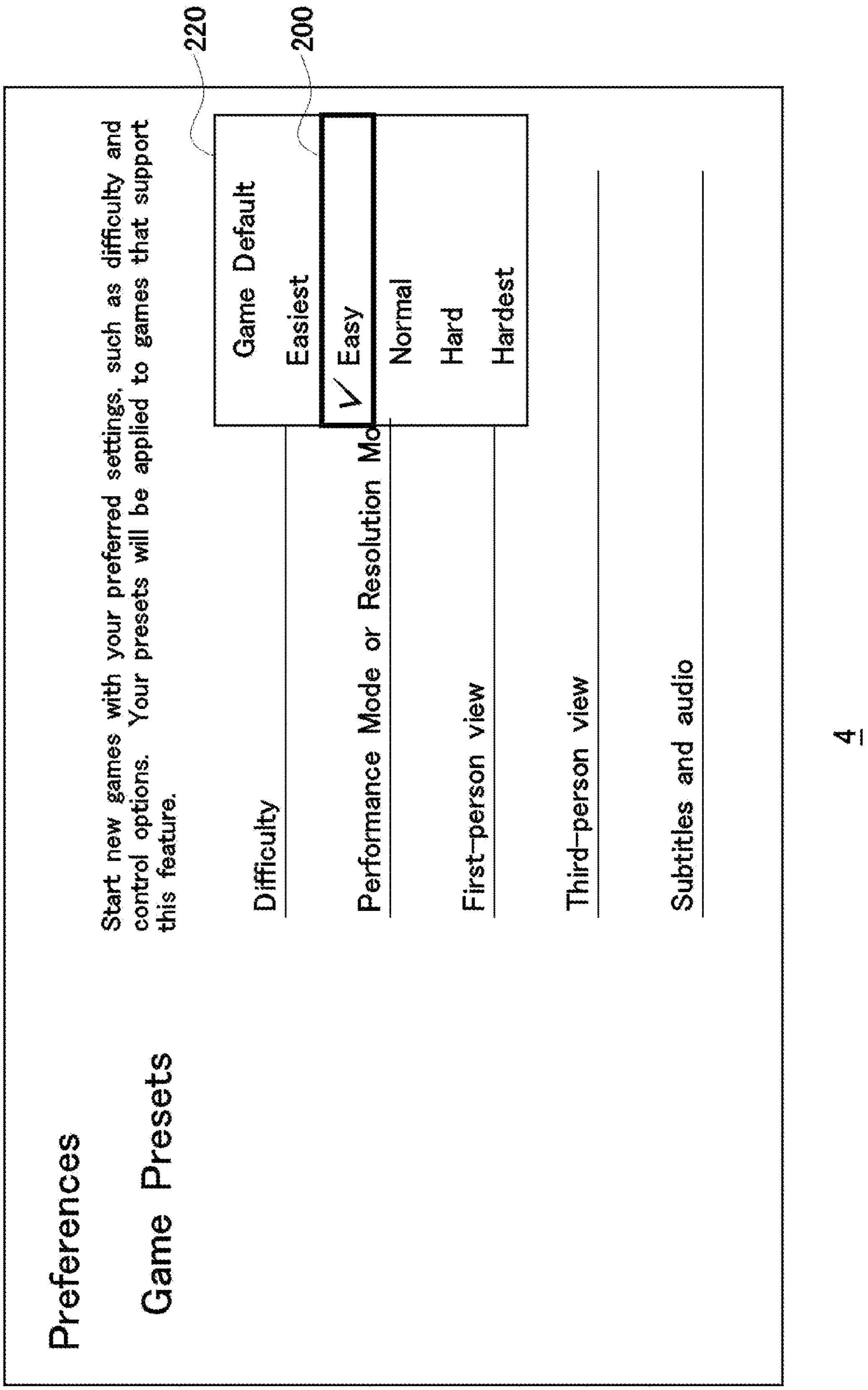
FIG. 5 is a diagram depicting an example of a selection window.

FIG. 5 depicts an example of a selection window 220. The selection window 220 includes six optional settings regarding the level of difficulty.

Game Default

This setting denotes the play mode set by default in the game. The game has one of the following five play modes determined as the default setting, "Normal" being usually set by default:

Easiest

This setting denotes the play mode for complete beginners.

Easy

This setting denotes the play mode for beginners.

Normal

This setting denotes the play mode for players of average ability.

Hard

This setting denotes the play mode for advanced players.

Hardest

This setting denotes the play mode for super advanced players.

The user moves the focus frame 200 across the selection window 220, places the focus frame 200 on the display region of the setting denoting the desired play mode, and operates the OK button of the input device 6. In the state of FIG. 5, the focus frame 200 is placed on the display region of "Easy." Operating the OK button here causes the registration section 110 to register to the preference holding section 112 the information denoting the easy mode for the item of the level of difficulty.

The preference holding section 112 holds the information denoting the user's preference regarding the level of difficulty in the game. Specifically, the preference holding section 112 holds the information identifying the user-selected level of difficulty from among multiple options representing the multiple levels of difficulty in the game. Although the embodiment has five optional levels representing the difficulty in the game, any other number of levels may be adopted to represent the difficulty in the game.

Figure 6:
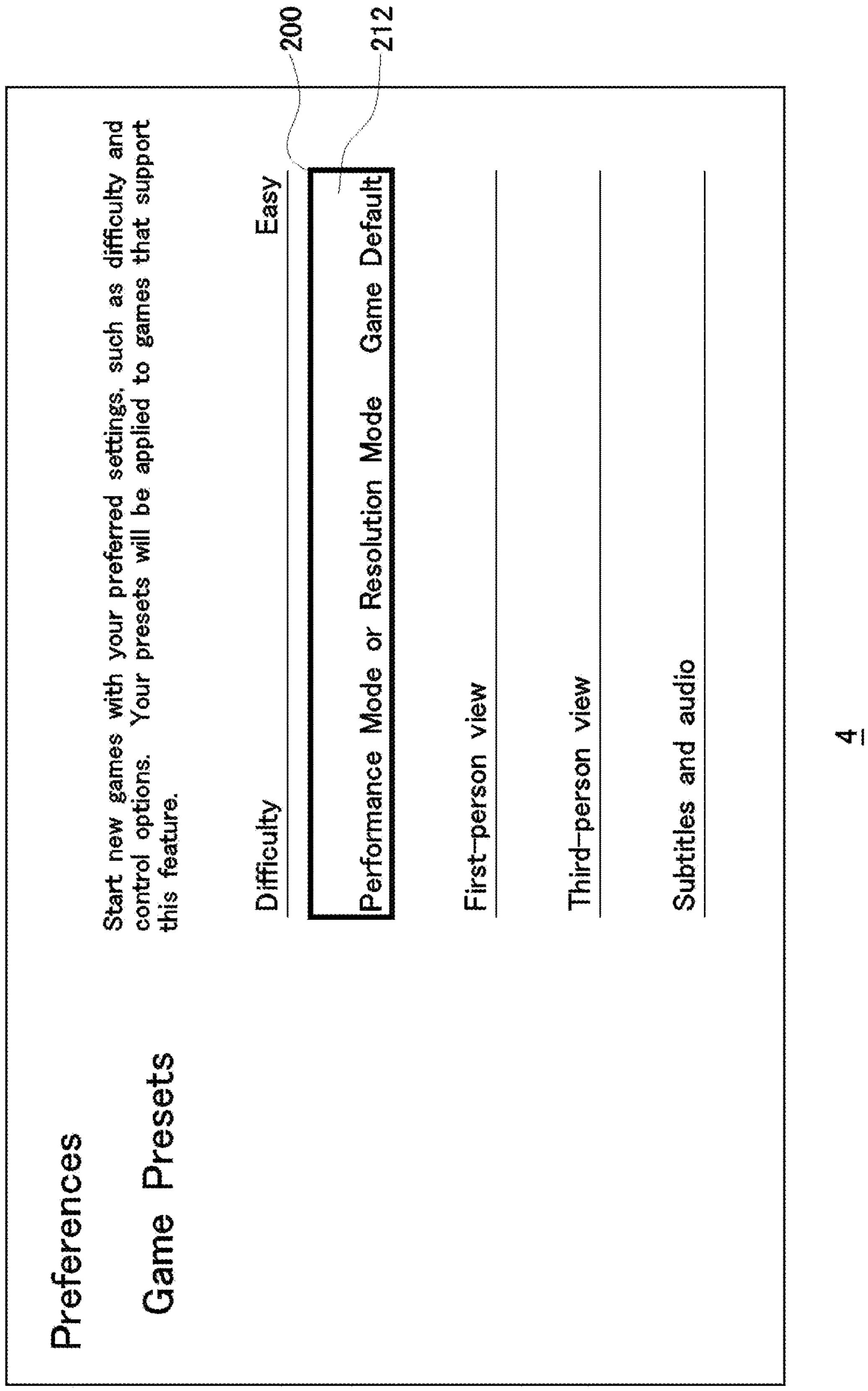
FIG. 6 is a diagram depicting another example of the preference information setting screen.

FIG. 6 depicts another example of the preference information setting screen. On this setting screen, the setting of the difficulty in the game is changed to "Easy." The user places the focus frame 200 on the display region of the setting item 212, and operates the OK button of the input device 6. Then, the registration section 110 displays a selection window for selecting either a performance mode or a resolution mode.

Figure 7:
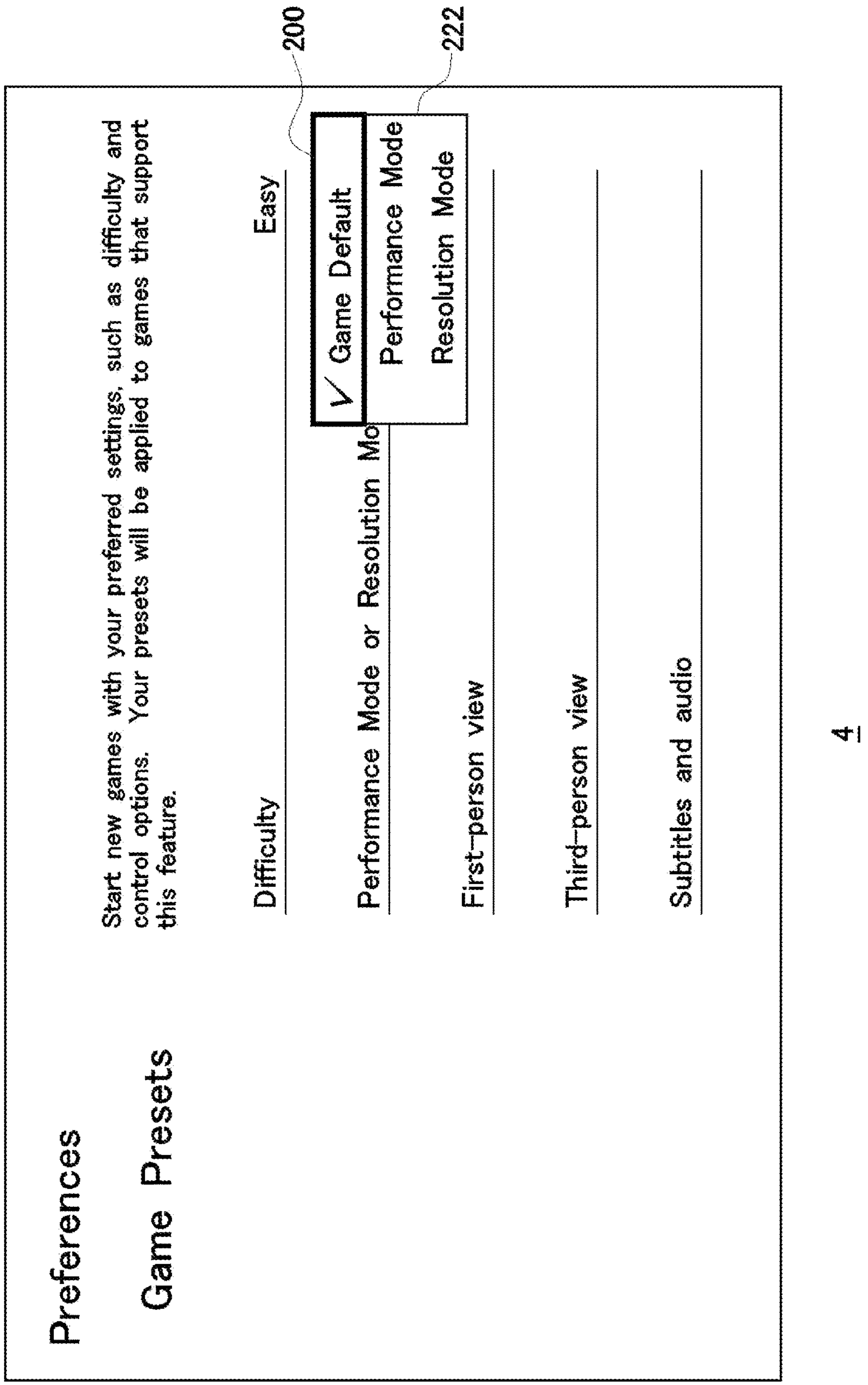
FIG. 7 is a diagram depicting another example of the selection window.

FIG. 7 depicts an example of a selection window 222. The selection window 222 includes three settings "Game Default," "Performance Mode," and "Resolution Mode" regarding a game mode, one of the settings being selectable.

Game Default

This setting denotes the mode set by default in the game. In general, the game has either the performance mode or the resolution mode set by default.

Performance Mode

This setting denotes the mode for improving the performance of the game by lowering frame rate or by reducing image resolution. In a case where a game under heavy processing load is to be played, the performance mode is recommended to be set.

Resolution Mode

This setting denotes the mode involving the use of high frame rate and/or high image resolution. In a case where a game emphasizing image quality is to be played, the resolution mode is recommended to be set.

The user places the focus frame 200 on the display region of the setting denoting the desired mode, and operates the OK button of the input device 6. In the state of FIG. 7, the focus frame 200 is placed on the display region of "Game Default." Operating the OK button here causes the registration section 110 to register the information denoting the game mode set default to the preference holding section 112.

The preference holding section 112 holds the information denoting the user's preference regarding the game mode. Specifically, the preference holding section 112 holds the information identifying the user-selected setting regarding frame rate and/or resolution for the game image.

Figure 8:
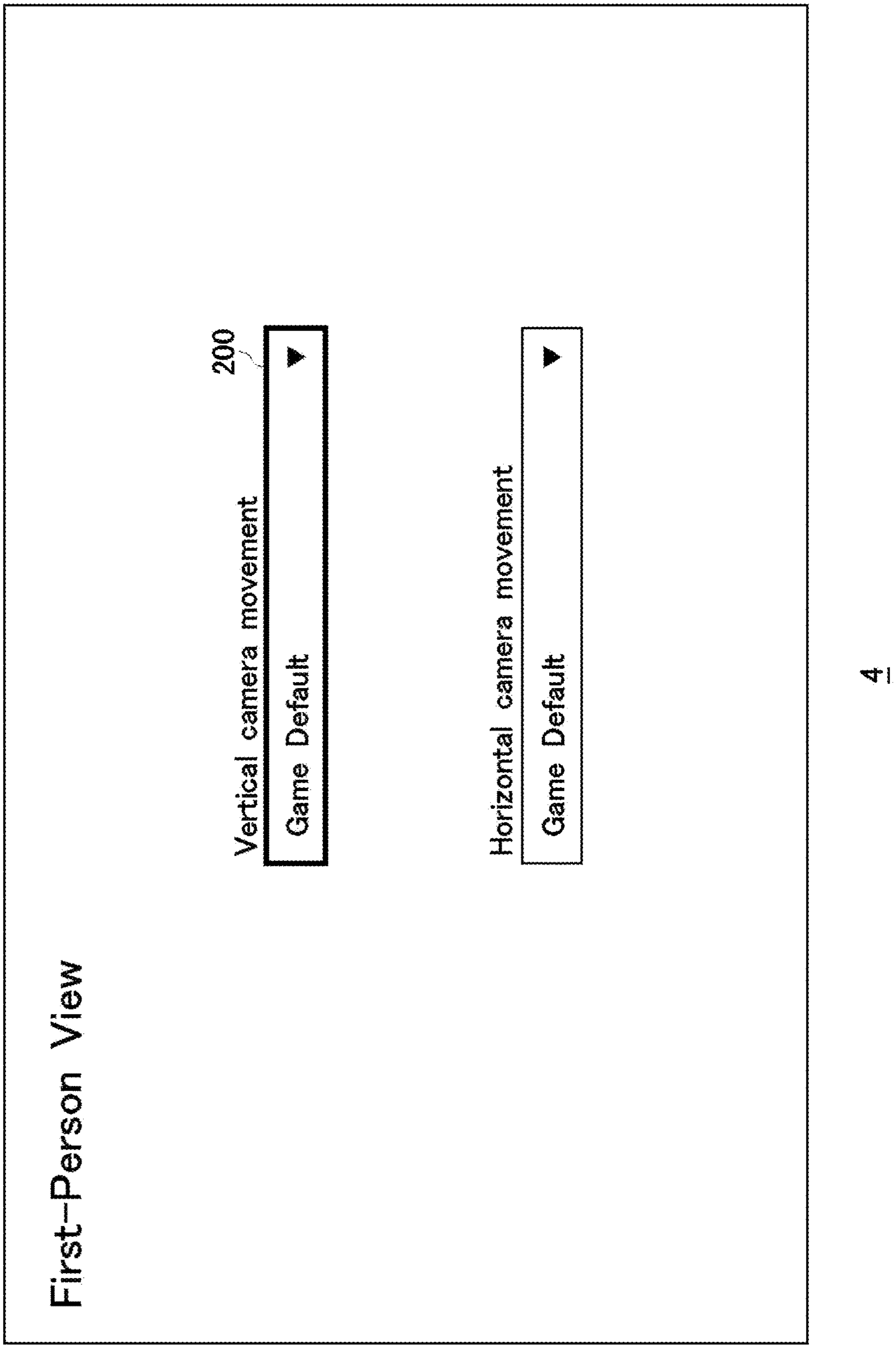
FIG. 8 is a diagram depicting an example of a first-person view operation setting screen.

FIG. 8 depicts an example of a first-person view operation setting screen displayed when the setting item 214 is selected. When the setting item 214 is selected on the setting screen in FIG. 4, the registration section 110 causes the output device 4 to output the first-person view operation setting screen. On this screen, the user sets the view operations in the vertical and horizontal directions. The view operations are what makes the user's preference manifested prominently and thus can greatly affect game play.

Figure 9:
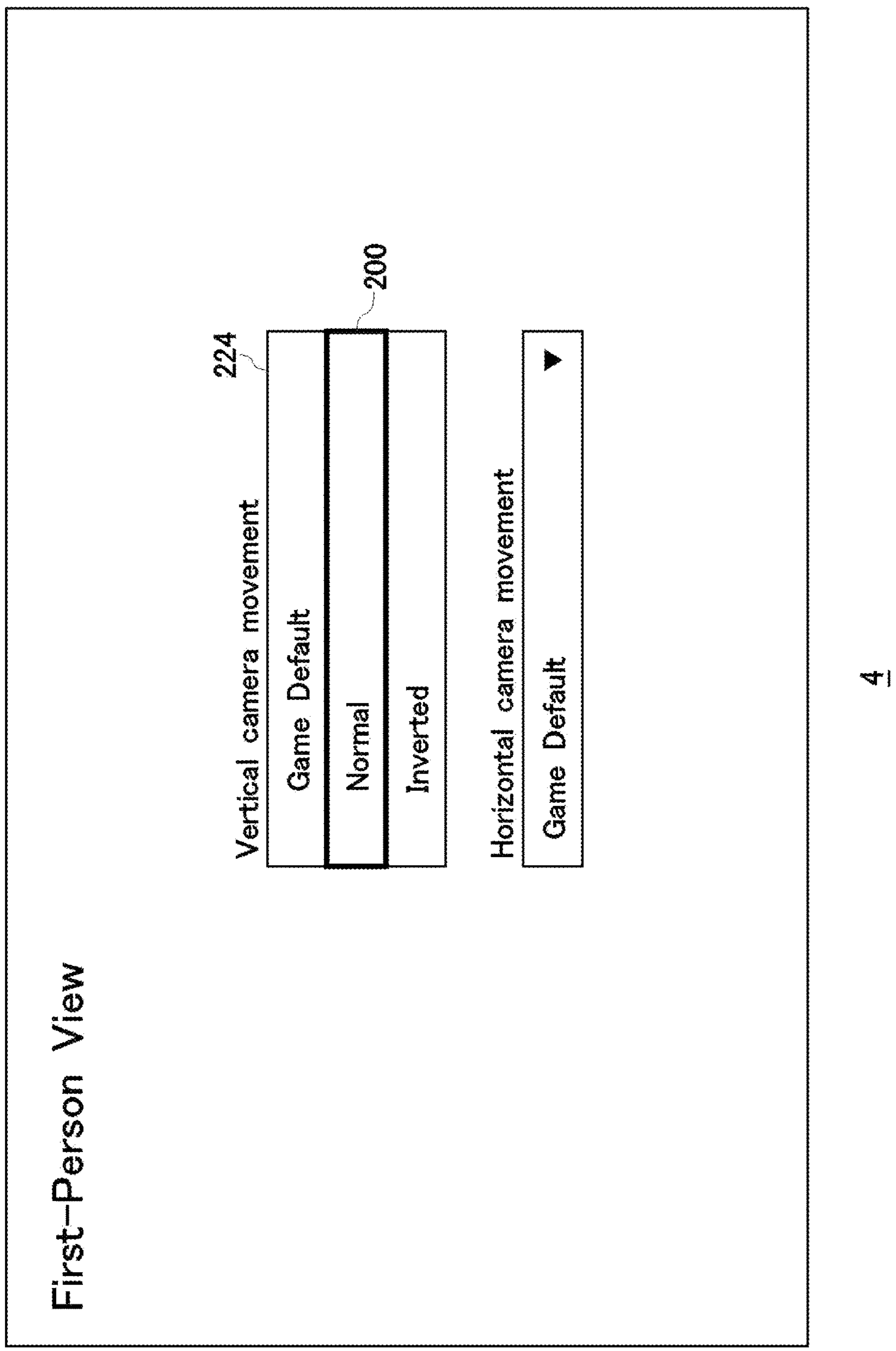
FIG. 9 is a diagram depicting another example of the selection window.

FIG. 9 depicts an example of a selection window 224 for setting the view operations in the vertical direction. The selection window 224 includes three settings "Game Default," "Normal," and "Inverted" regarding the view operations in the vertical direction, one of the settings being selectable.

Game Default

This setting denotes the view operations set by default in the game. The game may have the following "Normal" and "Inverted" settings prepared, one of which may be set by default:

Normal

This setting denotes the view operation of moving a game character's view (virtual camera) upward in response to the analog stick being operated upward. The view is moved downward when the analog stick is operated downward.

Inverted

This setting denotes the view operation of moving the game character's view downward in response to the analog stick being operated upward. The view is moved upward when the analog stick is operated downward.

The user selects any one of the above settings for the first-person view vertical operations.

Likewise, the user sets, as the view operations in the horizontal direction, the relations between the right-left operations of the analog stick on one hand and the game character's view operation on the other hand. Specifically, the user selects, when the analog stick is operated to the right, one of three settings such as the setting denoting the view operation of moving the game character's view rightward, the setting denoting the view operation of moving the game character's view leftward, and the setting denoting the view operation of moving the game character's view in a direction set by default in the game.

The registration section 110 registers to the preference holding section 112 the information denoting the setting selected by the user for first-person view. This allows the preference holding section 112 to hold the setting denoting the user's preference regarding the first-person view operations.

Figure 10:
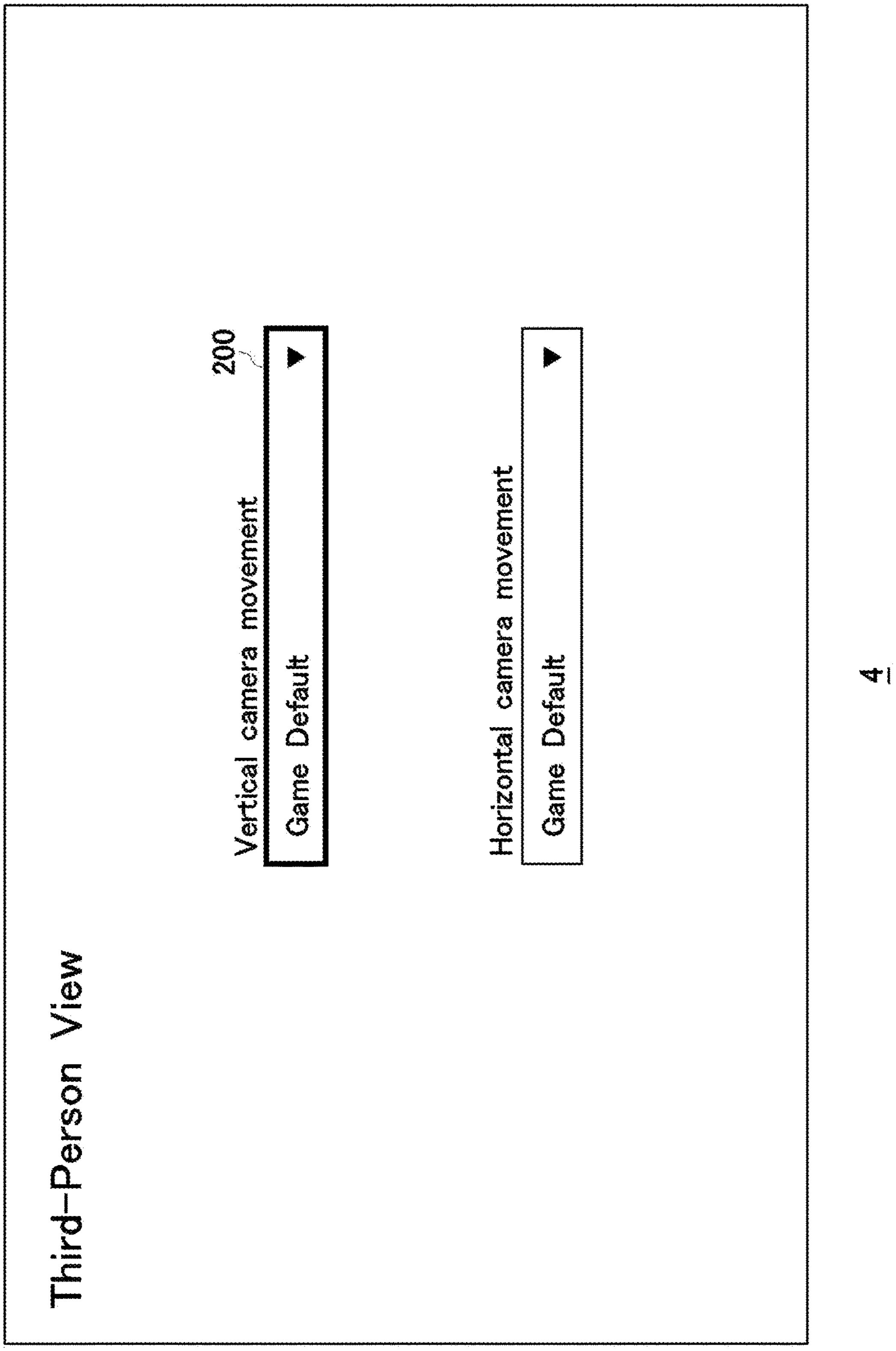
FIG. 10 is a diagram depicting an example of a third-person view operation setting screen.

FIG. 10 depicts an example of the setting screen displayed when the setting item 216 is selected. When the setting item 216 is selected on the setting screen in FIG. 4, the registration section 110 causes the output device 4 to display a third-person view operation setting screen. On this screen, the user sets the view operations in the vertical and horizontal directions.

The user sets, as the view operations in the vertical direction, the relations between upward-downward operations of the analog stick on one hand and the game character's view operation on the other hand. Specifically, the user selects, when the analog stick is operated upward, one of three settings such as the setting denoting the view operation of moving the game character's view (virtual camera) upward, the setting denoting the view operation of moving the game character's view downward, and the setting denoting the view operation of moving the game character's view in the direction set by default in the game.

Likewise, the user sets, as the view operations in the horizontal direction, the relations between the right-left operations of the analog stick on one hand and the game character's view operation on the other hand. Specifically, the user selects, when the analog stick is operated to the right, one of three settings such as the setting denoting the view operation of moving the game character's view rightward, the setting denoting the view operation of moving the game character's view leftward, and the setting denoting the view operation of moving the game character's view in the direction set by default in the game.

The registration section 110 registers to the preference holding section 112 the information denoting the setting selected by the user for third-person view. This allows the preference holding section 112 to hold the setting denoting the user's preference regarding the third-person view operations.

Figure 11:
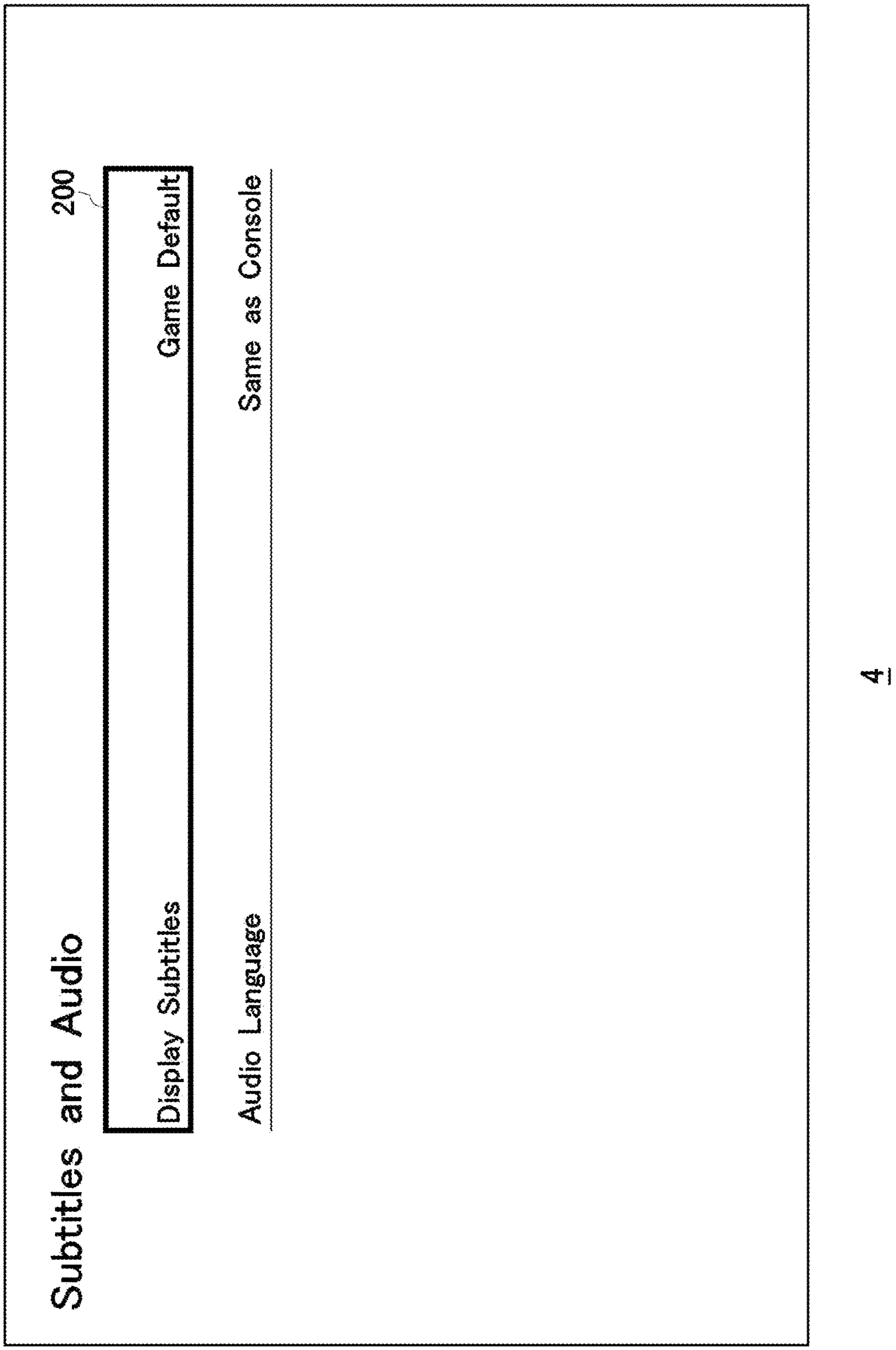
FIG. 11 is a diagram depicting an example of a setting screen for setting display subtitles and audio language.

FIG. 11 depicts an example of the setting screen displayed when the setting item 218 is selected. When the setting item 218 is selected on the setting screen in FIG. 4, the registration section 110 causes the output device 4 to display a setting screen for setting display subtitles and audio language. On this setting screen, the user sets display subtitles and audio language.

With respect to display subtitles, the user may select one of three settings such as the default setting for the game, the setting for turning on display subtitles, and the setting for turning off display subtitles. Also, regarding audio language, the user may select one of two settings such as the setting for adopting the same language as that set on the information processing device 10 and the setting for adopting the original language of the game. The registration section 110 registers to the preference holding section 112 the information denoting the user-selected settings with regard to display subtitles and audio language. This allows the preference holding section 112 to hold the settings denoting the user's preference regarding display subtitles and audio language.

In the manner described above, the preference information denoting the user's preference is held in the preference holding section 112. The preference information is applicable to multiple games. When executed for the first time by the information processing device 10, game software determines the settings for the game by referencing the preference information. Described below is the behavior of the game software 122 started for the first time by the information processing device 10.

The game execution section 120 starts the game software 122. The game software 122 includes at least the game program 124 for advancing the game, game data 126 including image data and audio data, and conversion information 128 for converting the preference information into the game settings. Upon receipt of the operation information from the user operating the input device 6, the game program 124 performs arithmetic processing for moving a player character in a virtual space. The output processing section 140 generates image data and audio data in the game and causes the output device 4 to output the generated data. The output processing section 140 may include a GPU executing rendering and other processes.

The game program 124 has a function of acquiring the preference information from the preference holding section 112 when started for the first time. For example, the game program 124 may be hard-coded to transmit a preference information acquisition request to the providing section 114 when started for the first time. The providing section 114 is capable of accessing the preference holding section 112. Upon receipt of the acquisition request, the providing section 114 retrieves the preference information held in the preference holding section 112 and provides the retrieved information to the game program 124.

Upon acquiring the preference information, the game program 124 determines the game settings according to the acquired preference information. At this point, the game program 124 may determine the game settings by use of the conversion information 128 for converting the preference information to the game settings.

In the embodiment, the preference holding section 112 holds, as the preference information, one of five levels representing the difficulty in the game. Thus, if the game program 124 has the difficulty of the game set in five levels beforehand, the game level set as the preference information may be used unchanged. On the other hand, if the game program 124 has the difficulty of the game set in some other number of levels, e.g., in three levels beforehand, then the preference information is required to be converted to the game settings.

In that case, the conversion information 128 defines the conversions of the preference information of "Easiest" or "Easy" to "easy mode" of the game, the preference information of "Normal" to "normal mode" of the game, and the preference information of "Hard" or "Hardest" to "hard mode" of the game. This enables the game program 124 to convert the preference information to the game settings. After determining the game settings based on the preference information, the game program 124 registers the determined game settings to the game setting holding section 130. The game setting holding section 130 thus holds the game settings with respect to each game. In this manner, the information processing device 10 of the embodiment allows the user to save labor on the work of selecting the game settings.

The game program 124 is configured to cause the output device 4 to display a setting selection screen when the program is started for the first time. In this case, the game settings determined on the basis of the preference information are reflected on the selection screen. Thus, if the game setting for the level of difficulty is determined to be easy mode, then "easy mode" is selected by default in the item of the level of difficulty in the game on the setting selection screen. Alternatively, the game program 124 may not cause the output device 4 to display the setting selection screen in a case where the game settings are determined on the basis of the preference information when the game program 124 is started for the first time.

It is preferred that the process of having the preference information reflected in the game settings be carried out only when the game program 124 is started for the first time. The game program 124 controls game progress and game operations according to the game settings held in the game setting holding section 130.

The present invention has been described above in conjunction with a specific embodiment. It is to be understood by those skilled in the art that suitable combinations of the constituent elements and of various processes of the embodiment described above as examples will lead to further variations of the present invention and that such variations also fall within the scope of this invention. Whereas the game program 124 has been described above in connection with the embodiment, application software other than games may be used instead. Although the information processing device 10 serving as the user terminal device includes the preference holding section 112 in the above embodiment, the server 5 functioning as an information processing device may include the preference holding section 112 instead.

INDUSTRIAL APPLICABILITY

The present invention may be applied to the technical field in which the settings of applications need to be established.

REFERENCE SIGNS LIST

1: Information processing system
10: Information processing device
100: Processing section
102: Communication section
110: Registration section
112: Preference holding section
114: Providing section
120: Game execution section
122: Game software
124: Game program
126: Game data
128: Conversion information
130: Game setting holding section
140: Output processing section

The invention claimed is:

1. An information processing device comprising:

a preference holding section configured to hold information denoting a preference of a user in at least one application, the information being applicable to a plurality of applications;

an execution section for executing the plurality of applications;

a providing section configured to provide the information denoting the preference of the user to the execution section; and a registration section configured to register the information denoting the preference of the user to the preference holding section, wherein the providing section is further configured to provide the information denoting the preference of the user to a new application in response to the new application being executed for a first time, wherein the execution section includes conversion information for converting the information denoting the preference of the user to a setting of the new application, and determines the setting of the new application based on the information denoting the preference of the user and the conversion information when the new application is executed for the first time, without requiring additional input from the user, and wherein the registration section is further configured to initiate display of a selection window to enable the user to select one of a plurality of options, the plurality of options comprising a first setting to cause a virtual camera within the application to move upward when an analog stick of an input device is operated upward, a second setting to cause the virtual camera to move downward when the analog stick is operated downward, and a third setting to use a default setting in the application for controlling vertical motion of the virtual camera, and the providing section is further configured to provide the one of the plurality of options selected by the user at the selection window as at least a portion of the information denoting the preference of the user to the new application when the new application includes use of the virtual camera in at least one of first-person vertical view operations and third-person vertical view operations.

2. The information processing device according to claim 1, wherein the preference holding section holds the information denoting the preference of the user with respect to a level of difficulty in game.

3. The information processing device according to claim 2, wherein the preference holding section holds information identifying, from among a plurality of levels representing the difficulty in game, one level selected by the user.

4. The information processing device according to claim 1, wherein the preference holding section holds the information denoting the preference of the user with respect to a view operation, including the one of the plurality of options selected by the user.

5. The information processing device according to claim 1, wherein the preference holding section holds the information denoting the preference of the user with respect to at least one of an image and an audio of the at least one application.

6. The information processing device according to claim 1, further comprising:

a setting holding section configured to hold the setting of the new application determined by the execution section based on the information denoting the preference of the user.

7. A program for a computer capable of accessing a holding section of a game console holding information denoting a preference of a user for at least a first application, the program performing operations comprising:

acquiring the information from the holding section;

registering the information at a preference holding section;

executing a first instance of a new application at the game console; and providing the information to the new application, wherein executing the first instance of the new application includes, converting the information to a setting of the new application, and applying the setting of the new application to the first instance of the new application, wherein registering the information at the preference holding section includes displaying a selection window to enable the user to select one of a plurality of options, the plurality of options comprising a first setting to cause a virtual camera within the application to move upward when an analog stick of an input device is operated upward, a second setting to cause the virtual camera to move downward when the analog stick is operated downward, and a third setting to use a default setting in the application for controlling vertical motion of the virtual camera, and wherein providing the information to the new application includes providing the one of the plurality of options selected by the user at the selection window as at least a portion of the information denoting the preference of the user to the new application when the new application includes use of the virtual camera in at least one of first-person vertical view operations and third-person vertical view operations.

8. The program according to claim 7, wherein converting the information includes using conversion information provided with the new application.

9. The program of claim 7, wherein the operations are only performed upon the first instance of the new application at the game console.

10. The program of claim 7, the operations are performed without additional input from the user.

11. The program of claim 7, the operations further comprising holding the setting of the new application, including the one of the plurality of options selected by the user.

12. The program of claim 7, the information including at least one of a level of difficulty, a view operation, an image data, and an audio data as selected by the user in the first application.

13. A game console, comprising:

a registration section configured to register preference information as set by a user at the game console for a first application;

a preference holding section configured to hold the preference information; and an execution section for executing a plurality of applications, the execution section including conversion information for converting the preference information to a setting in the plurality of applications, wherein, upon a first execution of a new application at the execution section, the execution section is configured to perform operations including retrieving the information from the preference holding section, converting the information to a new setting for the new application, and applying the new setting to the new application, and wherein the registration section is further configured to initiate display of a selection window to enable the user to select one of a plurality of options, the plurality of options comprising a first setting to cause a virtual camera within the application to move upward when an analog stick of an input device is operated upward, a second setting to cause the virtual camera to move downward when the analog stick is operated downward, and a third setting to use a default setting in the application for controlling vertical motion of the virtual camera, and storing the one of the plurality of options selected by the user at the selection window at the preference holding section as at least a portion of the preference information when the new application includes use of the virtual camera in at least one of first-person vertical view operations and third-person vertical view operations.

14. The game console of claim 13, wherein the execution section is further configured apply the new setting to the new application without requiring additional input from the user.

15. The game console of claim 13, wherein the operations are only performed upon the first execution of the new application.

16. The game console of claim 13, wherein the preference information includes a level of difficulty set by the user in the first application.

17. The game console of claim 13, wherein the preference information includes one level selected by the user among a plurality of levels representing difficulty in the first application.

18. The game console of claim 13, wherein the preference information includes a view operation selected by the user in the first application, including the one of the plurality of options selected by the user.

19. The game console of claim 13, wherein the preference information includes at least one of an image data and an audio data selected by the user in the first application.

20. The game console of claim 13, further comprising:

a setting holding section configured to hold the new setting for the new application determined by the execution section.

* * * * *